US007103550B2

(12) United States Patent
Gallagher et al.

(10) Patent No.: US 7,103,550 B2
(45) Date of Patent: Sep. 5, 2006

(54) METHOD OF USING SPEECH RECOGNITION TO INITIATE A WIRELESS APPLICATION PROTOCOL (WAP) SESSION

(75) Inventors: Warren Gallagher, Richmond (CA); Lisa Fast, Ottawa (CA); Shawn Griffin, Ottawa (CA)

(73) Assignee: Mitel Networks Corporation, Ottawa (CA)

( * ) Notice: Subject to any disclaimer, the term of this patent is extended or adjusted under 35 U.S.C. 154(b) by 971 days.

(21) Appl. No.: 09/896,146

(22) Filed: Jun. 29, 2001

(65) Prior Publication Data

US 2002/0095293 A1 Jul. 18, 2002

(30) Foreign Application Priority Data

Jun. 30, 2000 (GB) ................................ 0016144.8

(51) Int. Cl.
*G10L 21/00* (2006.01)

(52) U.S. Cl. .............................. 704/270.1; 379/88.22; 707/513; 370/352; 345/727

(58) Field of Classification Search ............. 704/270.1, 704/246; 709/246, 206; 379/88.22; 707/513; 370/352; 345/727
See application file for complete search history.

(56) References Cited

U.S. PATENT DOCUMENTS 5,757,783 A 5/1998 Eng et al.
6,044,062 A 3/2000 Brownrigg et al.
2001/0049603 A1* 12/2001 Sravanapudi et al. .... 704/270.1
2002/0003547 A1* 1/2002 Wang et al. ................ 345/727
2002/0006124 A1* 1/2002 Jimenez et al. ............. 370/352
2002/0112081 A1* 8/2002 Armstrong et al. ......... 709/246
2002/0174147 A1* 11/2002 Wang et al. ................ 707/513

FOREIGN PATENT DOCUMENTS

EP 0 859 500 A2 8/1998
WO WO 97/23973 7/1997
WO WO 00/17854 3/2000
WO WO 00/30329 5/2000
WO WO 00/52914 9/2000

OTHER PUBLICATIONS

Lucent Technologies Press Release, "VoiceXML Forum issues specification for voice internet access," Mar. 7, 2000.
Rohde, "Standard Completed for voice-activated Web browsing," InfoWorld.com, Mar. 9, 2000.
Moore, "Lucent deploys VoiceXML," InfoWorld.com, Mar. 31, 2000.
AT&T Features, "Explaining VoiceXML," Jun. 25, 2000.
Rehor, "What is VoiceXML?" VoiceXML Review, Jan. 2001.

* cited by examiner

*Primary Examiner*—Vijay Chawan
(74) *Attorney, Agent, or Firm*—Beyer Weaver & Thomas, LLP

(57) ABSTRACT

A method of initiating a data session between a wireless device and an information network over a wireless communication link includes establishing a voice session between the wireless device and a voice recognition application over the wireless communication link. A speech request is conveyed to the voice recognition application for information to be obtained from the information network. The voice recognition application converts the speech request into search criteria. A search of the information network is then initiated using the speech criteria and the voice session is terminated. A data session is then established with the wireless device and the search results are pushed to the wireless device over the wireless communications link.

20 Claims, 1 Drawing Sheet

4
PSTN
7
S-WAP SERVER
WIRELESS NETWORK
WAP GATEWAY
INTERNET
5
WAP BROWSER
1
2
3
6
WEB SERVER

METHOD OF USING SPEECH RECOGNITION TO INITIATE A WIRELESS APPLICATION PROTOCOL (WAP) SESSION

FIELD OF INVENTION

The present invention relates to Wireless Application Protocol (WAP) sessions and in particular, to a communication system and method of using speech recognition to initiate a WAP session between a wireless device and an information network over a wireless communications link.

BACKGROUND OF THE INVENTION

The Wireless Application Protocol (WAP) forum has developed the de-facto world standard for wireless information and telephony services on personal digital assistants (PDAs), digital mobile wireless telephones, and other mobile wireless devices, collectively referred to herein as "wireless devices". The WAP standard has been published as an open, global wireless protocol specification based on existing Internet standards, such as Extensible Markup Language (XML) and Internet Protocol (IP), for all wireless networks. WAP empowers users of wireless devices to access easily content such as live interactive information services and applications and display the accessed content on the display screens of the wireless devices. Services and applications include for example e-mail, customer care, call management, unified messaging, weather and traffic alerts, news, sports and information services, electronic commerce transactions and banking services, online address book and directory services, as well as corporate intranet applications.

WAP-enabled wireless devices typically include a Wireless Markup Language (WML) browser instead of a Hypertext Markup Language (HTML) browser to enable the wireless devices to access the Internet and view content, without hyperlinks. To start a WAP session, a user must enter the Uniform Resource Locator (URL) of the web site where the desired content is located into the WML browser. Unfortunately, WAP-enabled wireless devices provide limited facilities for entering text data or commands. Currently text data or commands are entered into WAP-enabled wireless devices using telephone dial pads, alphabets displayed on the display screens of the wireless devices, or styluses in the case of PDAs. Entering text data or commands into WML browsers in these manners has proven to be unsatisfactory.

It is known to use voice recognition for text data or command entry. However, employing voice recognition in wireless devices is not economically feasible due to the limited memory and power that are available in wireless devices. In addition, wireless networks are not generally capable of handling both voice and data over the course of a call. Furthermore, protocol standards for handling both voice and data over the course of a call have been unavailable.

It is therefore an object of the present invention to provide a novel communication system and method of using speech recognition to initiate a WAP session between a wireless device and an information network over a wireless communications link.

SUMMARY OF THE INVENTION

According to one aspect of the present invention, there is provided a method of using speech recognition to 'front-end' a data session between a wireless device and an information network over a wireless communications link. To initiate a data session, a user calls a voice recognition server using a wireless device and requests the desired content/information by speech. The server in turn contacts one or more web sites for the content/information and sends the found content/information to a gateway to initiate a data session with the wireless device over the wireless communications link.

According to another aspect of the present invention, there is provided a method of using speech recognition to initiate WAP sessions over a wireless network capable of handling both voice and data without having to initiate a call to a voice recognition server for each request. The user calls a voice recognition server and repeatedly requests the desired content/information by speech. The server in turn contacts one or more web sites for the content/information and sends the found content/information to a WAP gateway to initiate a WAP session with the wireless device over the wireless network.

According to yet another aspect of the present invention, there is provided a method of initiating a data session between a wireless device and an information network over a wireless communications link, said method comprising the steps of:

establishing a voice session between said wireless device and a voice recognition application over said wireless communications link;

conveying a speech request to said voice recognition application for information to be obtained from said information network, said voice recognition application converting said speech request into search criteria;

initiating a search of said information network using said search criteria;

establishing a data session with said wireless device; and pushing the search results to said wireless device over said wireless communications link.

In one embodiment, the method further includes the step of terminating the voice session prior to establishing the data session. In this case, it is preferred that the voice session is terminated after completion of the search. Preferably, completion of the search is confirmed prior to terminating the voice session. The confirming may include playing a voice announcement that confirms completion of the search or may include playing a voice announcement that provides feedback concerning the results of the search and awaiting an indication from the wireless device that the search results are to be pushed prior to establishing the data session.

In another embodiment, the method includes signaling the wireless device after the voice session has been terminated to confirm completion of the search and awaiting an instruction from the wireless device prior to establishing the data session.

In the preferred embodiment, the data session is a WAP session, the wireless device is WAP enabled and the wireless communications link includes a WAP gateway.

According to still yet another aspect of the present invention, there is provided a communication system comprising:

a server including a voice recognition application and an information network search application;

a wireless communications link; and a wireless device to establish a call to said server over said wireless communications link, said voice recognition application prompting input of a search request upon establishment of said call and converting said speech request into search criteria, said information network search application using said search criteria to initiate a search of an information network and pushing the results of said search to said wireless device over said wireless communications link.

The present invention provides advantages in that search content can be obtained and displayed on the display screen of a wireless device using speech recognition without worrying about the power and memory limitations of the wireless device.

BRIEF DESCRIPTION OF THE DRAWING

An embodiment of the present invention will now be described more fully with reference to the accompanying drawing in which.

DETAILED DESCRIPTION OF THE PREFERRED EMBODIMENT

Figure 1:
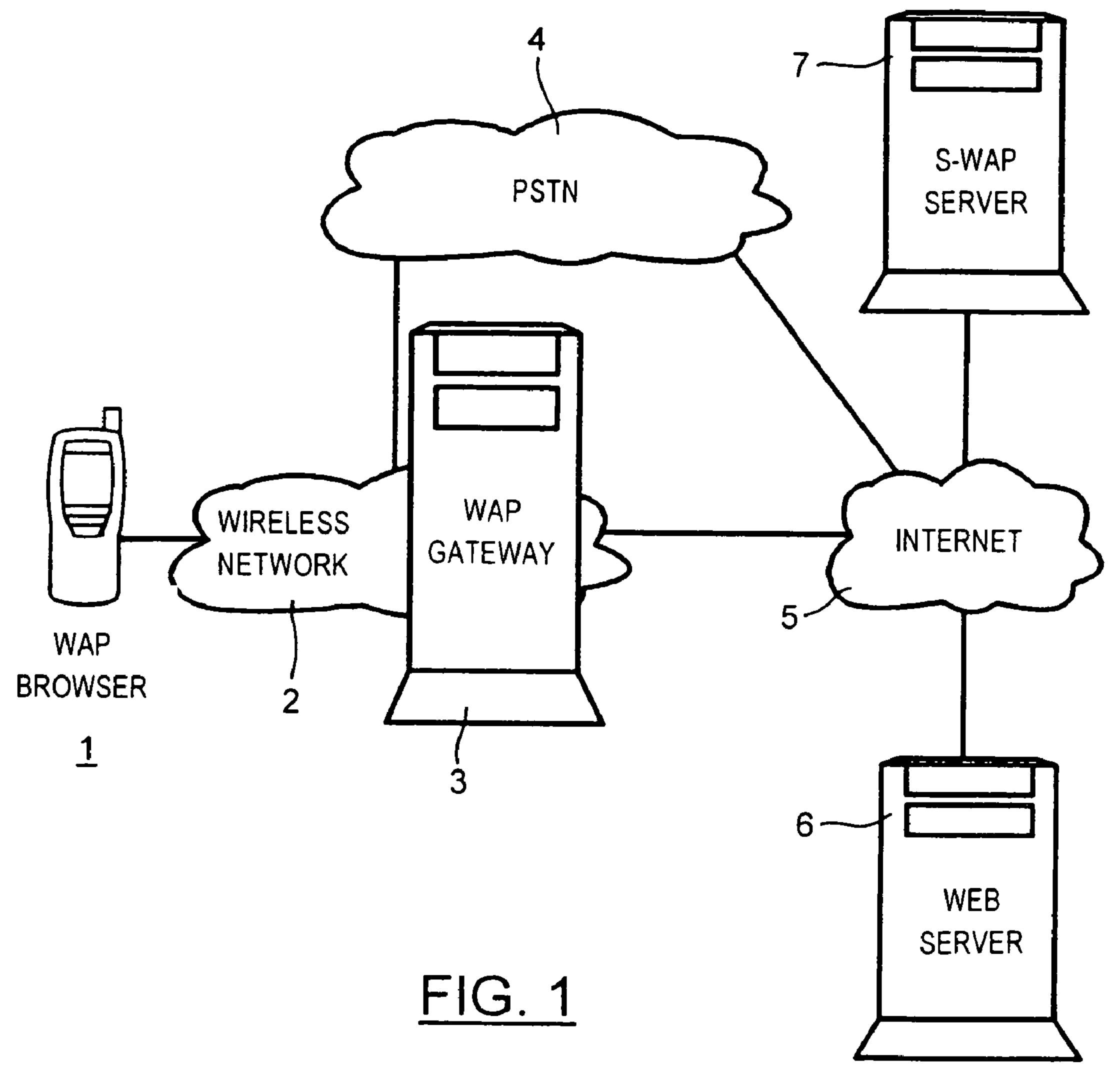
FIG. 1 illustrates a network topology over which a WAP session is carried and initiated using speech recognition.

The present invention relates generally to a method and system of using speech recognition to initiate a data session between a wireless device and an information network, such as the Internet, over a wireless communications link. To initiate a data session, a voice call is made by the wireless device to a remote server executing a speech recognition application. Speech over the voice call is translated by the speech recognition application into search criteria and is used by the server to locate and retrieve desired information from the information network. The retrieved information is then pushed to the wireless device via the wireless communications link and is displayed on a display screen of the wireless device.

Turning to FIG. 1, a communication system is shown including a wireless network 2 coupled to a public switched telephone network (PSTN) 4 and to an information network such as the Internet 5 through a WAP 1.2 gateway 3. PSTN 4 also communicates with the Internet 5. A web server 6 and an S-WAP server 7 are shown and communicate with the Internet 5. A WAP-enabled wireless device 1 is shown and can be used to initiate WAP data sessions using speech recognition as will be described. WAP-enabled wireless device 1 includes a WML WAP browser to allow WAP content to be displayed on its display screen.

The S-WAP server 7 includes an S-WAP browser incorporating a VoiceXML application. S-WAP browser is a software application capable of locating and retrieving information from the Internet 5 in response to recognized speech commands and capable of pushing the retrieved information to the wireless device 1 over the wireless network 2.

To initiate a WAP data session, a user places a voice call to establish a voice session with the S-WAP server 7 over the wireless network 2 and the PSTN 4. Upon receipt of the voice call by the S-WAP server 7, the S-WAP browser loads the VoiceXML application, which in turn plays a voice prompt to the user asking for the information for which the user is searching. Upon receiving the user's spoken response to the voice prompt, the S-WAP browser translates the speech using voice recognition into search criteria in the form of a series of searchable strings and evokes a CGI script. The CGI script in turn passes the directory number (DN) of the wireless device 1 and the searchable strings to the Internet 5 to carry out a search. During the search, one or more web sites are contacted by the S-WAP browser to obtain the desired information to be returned to the user.

When the results of the search are returned to the S-WAP browser, the VoiceXML application plays a confirmation voice prompt to the user to notify the user that the search has been completed. Following the confirmation voice prompt, the VoiceXML application terminates the voice call with the wireless device 1 so that the wireless device 1 may receive the results of the search. Upon termination of the voice call, the S-WAP server 7 initiates a WAP data session with the wireless device 1. Specifically, the CGI script pushes the search results to the wireless device 1 over the wireless network 2 through the WAP 1.2 gateway 3 using the DN of the wireless device and the Push Proxy Gateway (PPG) functionality of the WAP 1.2 gateway.

With respect to the search completion confirmation, a number of options are available. For example, when the results of the search are available, the VoiceXML application can simply play a voice announcement indicating that the search results are ready to be transmitted. Alternatively, the VoiceXML application can play a voice announcement that provides feedback concerning the results of the search. In this case, the VoiceXML application may play a voice announcement that includes user selectable options allowing the user to decide whether the search results are to be pushed to the wireless device 1.

Although the communication system is described as pushing the search results directly to the wireless device 1 during a WAP data session once the voice call is terminated, other options are available. For example, the S-WAP browser can send a web alert URL to the wireless device 1 upon completion of the search. When the web alert URL is selected by the user using the wireless device, the wireless device makes a call to the S-WAP server 7 causing the S-WAP browser to push the search results associated with the web alert URL to the wireless device.

From a user's point of view, information can be searched and retrieved for display by the wireless device in a simple and efficient manner by carrying out the following steps:

calling the S-WAP server;

speaking the information to be searched;

terminating the call; and then waiting for the WAP search content to arrive at the wireless device.

If a web alert URL is used, the additional steps of selecting the web alert URL and initiating a call to the S-WAP server 7 are required after the call has been terminated before the WAP search content is delivered to the wireless device.

As will be appreciated, the present invention uses speech recognition to "glue" voice and data sessions allowing spoken commands to be used to initiate searches of information networks. Since the voice recognition application is executed by a remote server, the limited memory and power of wireless devices is not of concern.

If the wireless network is a third generation (3G) network capable of handling both voice and data traffic over the course of a call, speaking the search criteria and receiving the search content can be achieved during a single call to the S-WAP server 7. This avoids the need to terminate the voice call to the S-WAP server 7 in order to receive the WAP search content. In this case, if a user makes a call to the S-WAP server 7 over the 3G network, in order to obtain search content, the user simply needs to speak the search criteria and await the search results without having to terminate the call. Once the search content is received, if further searching is required, the user simply needs to speak the additional search criteria and again await the search results. This process can be performed indefinitely.

As will be appreciated to those of skill in the art, the present invention is adaptable to provide services to users beyond obtaining content from the Internet. Such services may include for example e-mail, customer care, call management, unified messaging, weather and traffic alerts, news, sports and information services, electronic commerce transactions and banking services, online address book and directory services, as well as corporate intranet applications.

Although a preferred embodiment of the present invention has been described herein, it will be understood by those skilled in the art that variations and modifications may be made without departing from the spirit and scope thereof as defined by the appended claims.

What is claimed is:

1. A method of initiating a data session between a wireless device and an information network over a wireless communications link, said method comprising the steps of:

establishing a voice session between said wireless device and a voice recognition application over said wireless communications link;

conveying a speech request to said voice recognition application for information to be obtained from said information network, said voice recognition application converting said speech request into search criteria;

initiating a search of said information network using said search criteria;

establishing a data session with said wireless device; and pushing the search results to said wireless device over said wireless communications link.

2. The method of claim 1 further comprising the step of terminating the voice session prior to establishing said data session.

3. The method of claim 2 wherein said voice session is terminated after completion of said search.

4. The method of claim 3 further comprising the step of confirming completion of said search prior to terminating said voice session.

5. The method of claim 4 wherein said confirming includes playing a voice announcement that confirms completion of said search.

6. The method of claim 4 wherein said confirming includes the steps of:

playing a voice announcement that provides feedback concerning the results of said search; and awaiting an indication from said wireless device that said search results are to be pushed prior to establishing said data session.

7. The method of claim 2 wherein said data session is a WAP session, said wireless device being WAP enabled and said wireless communications link including a WAP gateway.

8. The method of claim 2 further comprising the steps of:

signaling said wireless device after said voice session has been terminated to confirm completion of said search; and awaiting an instruction from said wireless device prior to establishing said data session.

9. The method of claim 8 wherein said voice session is terminated after completion of said search.

10. The method of claim 9 wherein said data session is a WAP session, said wireless device being WAP enabled and said wireless communications link including a WAP gateway.

11. The method of claim 10 wherein said signaling is a web alert URL, selection of said web alert URL causing said wireless device to generate said instruction.

12. The method of claim 1 wherein said voice recognition application is loaded on a server, said server also executing a browser, said browser receiving said search criteria from said voice recognition application and initiating said search, said browser also establishing said data session and pushing said search results.

13. The method of claim 12 wherein said voice recognition application is a VoiceXML application, said VoiceXML application prompting input of said speech request upon establishment of said voice session and converting said speech request into searchable strings.

14. The method of claim 13 wherein said browser evokes a CGI script to carry out said search using said searchable strings.

15. A communication system comprising:

a server including a voice recognition application and an information network search application;

a wireless communications link; and a wireless device to establish a call to said server over said wireless communications link, said voice recognition application prompting input of a search request upon establishment of said call and converting said speech request into search criteria, said information network search application using said search criteria to initiate a search of an information network and pushing the results of said search to said wireless device over said wireless communications link.

16. A communication system according to claim 15 wherein said server terminates said call and establishes a data session with said wireless device in order to push the search results thereto.

17. A communication system according to claim 16 wherein said server plays a voice announcement that confirms completion of the search prior to terminating the call.

18. A communication system according to claim 16 wherein said server plays a voice announcement that provides feedback concerning the results of the search and awaits an instruction from the wireless device prior to establishing the data session.

19. A communication system according to claim 18 wherein said voice recognition application is a VoiceXML application and wherein said information network search application is a browser evoking a CGI script to carry out said search.

20. A communication system according to claim 18 wherein said data session is a WAP session, said wireless device being WAP enabled and said wireless communications link including a WAP gateway.

* * * * *